US005266944A

United States Patent [19]

Carroll et al.

[11] Patent Number: 5,266,944
[45] Date of Patent: Nov. 30, 1993

[54] ELECTRONIC SYSTEM AND METHOD FOR MONITORING ABUSERS FOR COMPLIANCE WITH A PROTECTIVE ORDER

[75] Inventors: Gary T. Carroll; David G. O'Neil; Harold R. Elgie, all of Boulder, Colo.

[73] Assignee: Bodyguard Technologies, Inc., Boulder, Colo.

[21] Appl. No.: 721,242

[22] Filed: Jun. 26, 1991

[51] Int. Cl.[5] .......... G08B 5/22; G08B 23/00; H04Q 1/00; H04M 11/04

[52] U.S. Cl. .......... 340/825.36; 379/38; 340/573; 340/825.54

[58] Field of Search .......... 340/825.54, 825.36, 340/539, 573, 505, 506, 825.34, 513, 825.44, 825.72; 379/38, 49, 106

[56] References Cited

U.S. PATENT DOCUMENTS

| | | | |
|---|---|---|---|
| 3,541,995 | 11/1970 | Fathauer | 119/51 |
| 3,914,692 | 10/1975 | Seaborn, Jr. | 379/38 |
| 4,196,425 | 4/1980 | Williams et al. | 340/573 |
| 4,263,595 | 4/1981 | Vogel . | |
| 4,384,288 | 5/1983 | Walton | 340/825.34 |
| 4,598,272 | 7/1986 | Cox | 340/539 |
| 4,658,357 | 4/1987 | Carroll et al. | 340/359 |
| 4,675,656 | 6/1987 | Narcisse | 340/539 |
| 4,682,155 | 7/1987 | Shirley | 340/573 |
| 4,736,196 | 4/1988 | McMahon et al. | 340/573 |
| 4,747,120 | 5/1988 | Foley | 379/38 |
| 4,777,477 | 10/1988 | Watson | 340/573 |
| 4,777,478 | 10/1988 | Hirsch et al. | 340/573 |
| 4,792,796 | 12/1988 | Bradshaw et al. | 340/539 |
| 4,837,568 | 6/1989 | Snaper | 340/825 |
| 4,885,571 | 12/1989 | Pauley et al. | 340/573 |
| 4,918,425 | 4/1990 | Greenberg et al. | 340/539 |
| 4,918,432 | 4/1990 | Pauley et al. | 340/573 |
| 4,952,913 | 8/1990 | Pauley et al. | 340/825 |
| 4,952,928 | 8/1990 | Carroll et al. | 340/825 |
| 4,980,671 | 12/1990 | McCurdy | 379/38 |
| 4,999,613 | 3/1991 | Williamson et al. | 379/38 |
| 5,103,474 | 4/1992 | Stoodley et al. | 379/38 |
| 5,117,222 | 5/1992 | McCurdy et al. | 379/38 |

OTHER PUBLICATIONS

Bucsko; "Electronic Bracelet Kept Husband Away"; *Courier and Press,* (Aug. 10, 1988), Evansville, Indiana.
Proposed Senate Bill 1122, State of California, (Mar. 8, 1991).

*Primary Examiner*—Donald J. Yusko
*Assistant Examiner*—R. Gray
*Attorney, Agent, or Firm*—Fitch, Even, Tabin & Flannery

[57] ABSTRACT

An electronic monitoring system monitors an abuser for compliance with a protective order. When a violation is detected, the system automatically gathers evidence, independent of any that may be provided by the victim of the abuse, to establish probable cause of such violation. The monitoring system includes a transmitter tag worn by the abuser that transmits a unique identifying (ID) signal, either periodically or when triggered. A receiving/monitoring device (RMD), or equivalent, is carried by or positioned near the victim, e.g., in the victim's house and/or place of employment, for receiving the ID signal. A central monitoring computer is located at a central monitoring location that is in selective telecommunicative contact with the RMD. The computer maintains a response file that provides appropriate instructions to personnel or equipment at the central monitoring location or elsewhere in the event an abuser is detected by the victim's RMD, so that appropriate action can be taken in order to electronically gather evidence of the protective order violation, and to protect the victim. One embodiment of the invention also includes means for detecting and reporting any attempt to tamper with the transmitter tag, as sensed by either the RMD, the equivalent of an RMD installed at the abuser's house (to detect when the abuser is present thereat), or a wide area radio communications network that monitors a wide geographical area wherein the victim and abuser reside.

24 Claims, 4 Drawing Sheets

ELECTRONIC SYSTEM AND METHOD FOR MONITORING ABUSERS FOR COMPLIANCE WITH A PROTECTIVE ORDER

BACKGROUND OF THE INVENTION

The present invention relates to a system and method for electronically monitoring individuals for compliance with a protective order issued by a court of law, or other governmental authority.

A protective order, sometimes referred to as a "protection order" or "court order of protection" may be defined as any injunction issued by a court (or other authority) for the purpose of preventing acts or threatened acts of violence or harassment. A protective order refers to and is inclusive of both temporary and final orders issued by civil and criminal courts. Other terms frequently used to connotate a protective order include: emergency protective order, temporary restraining order, permanent restraining order, and no-contact order, or orders of protection. The present invention has applicability to all such types of protective orders, or orders of protection, regardless of what term or title may be applied thereto.

A protective order is typically issued to prevent a first individual from contacting a second individual in order to protect the second individual from acts or threatened acts of violence or harassment or other harm (hereafter "abuse") that the first individual may commit against the second individual. Such protective orders are issued by a court having appropriate jurisdiction over the first individual whenever the first person has a history of abusing the second individual, or whenever other factors are present that indicate the second individual is at risk of being abused by the first individual.

The most common application of the present invention is in the domestic relations field, and more particularly the present invention finds primary applicability in monitoring compliance with no-contact orders in the domestic violence environment. Domestic violence is normally defined as including any harmful physical contact, or threat thereof, between family or household members, or unmarried couples, including destruction of property, which physical contact or threat thereof is used as a method of coercion, control, revenge, or punishment. Thus, for many applications of the present invention, the first individual is typically a spouse, ex-spouse, or significant "other" of the second individual. However, it is to be understood that the invention is not limited to monitoring compliance with no-contact orders in the domestic violence environment. The present invention may also be used to monitor protective orders that have been issued in any instance or situation where a first person shows a continuing propensity to abuse, e.g., to harass, bother, annoy, threaten, batter, interfere with, or otherwise impinge on the rights or privacy of, a second person. Hence, although the present invention will hereafter be described in terms of monitoring compliance with no-contact orders in a domestic violence environment, it should be recognized that the invention is not limited to such an application.

Thus, by way of example and not limitation, whenever there is a history or risk of domestic violence, it is not uncommon for a court of law, or other governmental authority, to issue a restraining order that prevents one person (e.g., a spouse, ex-spouse, or significant "other"), hereafter the "abuser", from making contact with another person (e.g., the first person's spouse, ex-spouse, or significant "other"), hereafter the "victim". Such orders, frequently referred to as "no-contact orders", but also referred to broadly herein as simply "protective orders", are thus issued because the victim may be at risk of abuse or harassment, and the protective order offers some measure of protection, at least theoretically, for the victim, or for the victim's property.

Unfortunately, in practice, a protective order is just a document, or "piece of paper", that offers no protection to the victim unless it is honored by the abuser; or unless it is enforced. Disadvantageously, the abuser may be of a character and disposition to pay little, if any, heed to the protective order. That is, many, if not most, abusers will simply ignore the protective order and continue in their abusing ways until such time as the protective order is enforced. Enforcement of the protective order, unfortunately, rarely occurs due to a variety or problems, including, but not limited to, victim reluctance to contact police, victim fear of abuser reprisal, and lack of evidence. As a result, protective orders are rarely enforced, and are essentially "toothless", i.e., seldom does an abuser suffer consequences from violating a protective order. Hence, it is clear that what is needed is a more effective way to monitor compliance with a protective order, and more particularly a more effective way to monitor an abuser so as to assume his or her continuing compliance with the protective order, and to assure that when an abuser does violate a protective order, the abuser suffers some meaningful consequences.

In order to protect the civil rights of an abuser, a violation of a protective order can only be established through the existence of credible evidence of a violation, or at least evidence that establishes "probable cause" that a violation has or will likely occur. Such evidence has heretofore usually taken the form of testimony, from the victim if available, or from other witnesses (such as neighbors, police officers, case workers, or others) who may have observed the violation, or who may have observed behavior in the abuser which would lead a reasonable person to conclude there is probable cause that a violation has or will occur. Unfortunately, as indicated above, despite the imposition of a protective order, some abusers ignore the protective order and continue to make their abusing contact with the victim. When such violations of the protective order occur, the victim may suffer serious harm, even death. Further, if the victim survives, the victim may be afraid to testify against the abuser in fear of reprisals that the abuser may inflict. Hence, the violation of the protective order is typically not reported, and the court or other governmental authority that imposed the order is not made aware of its violation. Thus, in effect, the violation of the protective order goes undetected and unpunished. What is needed, therefore, is a more secure and reliable way to monitor compliance with a protective order, one that does not require the cooperation and testimony of the victim, or other witnesses who must be on hand when the violation occurs.

Electronic monitoring systems are known in the art for monitoring an individual for compliance with a sentence to remain under house arrest at a specified location, or to at least be at a specified location during certain hours of the day. Such systems are commonly referred to as electronic house arrest monitoring (EHAM) systems. Currently available EHAM systems fulfill a valuable need in that they allow a relatively large number of individuals who have been sentenced to remain under house arrest, or who are under parole or probation requirements to remain at certain locations at specified times, to be electronically monitored for compliance with whatever restrictions have been imposed. Such electronic monitoring can advantageously be carried out at a fraction of the cost of incarceration of the monitored individuals; and also at a much reduced cost over conventional probation/parole monitoring procedures. One type of EHAM system known in the art, referred to as an "active" monitoring system, generates and transmits radio wave signals as part of the monitoring process. Such an active EHAM system is described, e.g., in U.S. Pat. No. 4,918,432, issued to Pauley et al., which patent is incorporated herein by reference. In the Pauley et al. active EHAM system, each individual being monitored is fitted with an electronic bracelet or anklet. Such bracelet or anklet, referred to in the referenced patent as a "tag", includes a transmitter that periodically transmits a identifying radio wave signal (unique to each tag, and hence to each individual) over a short range (e.g., 150 feet). A field monitoring device (FMD) is installed at each location where the monitored individual(s) is supposed to be. If the monitored individual(s) is present at the FMD location, a receiver circuit within the FMD receives the unique identifying signal. The FMD processing circuits can thus determine that a specific individual is present at the location of the FMD when the signal is received. This information (which may be considered as "presence data") is stored within the FMD memory circuits for subsequent downloading to a central monitoring location. A computer, or central processing unit (CPU), located at the central monitoring location periodically or randomly polls the various FMD locations through an established telecommunicative link, e.g., through standard telephone lines, in order to prepare reports indicating the presence or absence of the individuals at the specified locations. Such reports are then used by the agency charged with the responsibility for monitoring the individuals to ascertain whether or not such monitored individuals are in compliance with whatever restrictions have been imposed.

An important feature of the Pauley et al. EHAM system is the ability of the tag to detect any attempts to tamper with it, e.g., attempts to remove the tag from the monitored individual. If a tamper event is detected, such occurrence is signaled to the FMD in the next identifying signal that is transmitted; and the FMD, in turn, includes the ability to establish telecommunicative contact with the central CPU in order to report such tamper event. All data sent from the FMD to the central CPU includes address-identifying data that identifies the specific location where the FMD is located.

Other active EHAM systems known in the art also include the ability to detect tamper events, such as U.S. Pat. No. 4,777,477, issued to Watson, wherein any attempt to cut or break the strap that attaches the tag to the individual is detected and signaled to a local receiver. The '477 Watson patent is also incorporated herein by reference.

Still additional active EHAM systems known in the art include the ability to adaptively change the monitoring configuration to best suit the needs of the agency responsible for carrying out the monitoring function. See U.S. Pat. No. 4,952,928 issued to Carroll et al., also incorporated herein by reference. The Carroll et al. system advantageously includes the ability to sense and monitor various physiological data of the monitored individual, such as heart rate, blood pressure, body position (horizontal or vertical), and the like, so that such data can be analyzed at the central monitoring location to determine if the monitored individual is complying with other restrictions, such as abstinence from drugs or alcohol.

An article appearing in the Evansville, Ind., *Courier and Press,* dated Aug. 10, 1988, indicates that a judge used an electronic monitor to protect a victim from a man accused of abuse in a divorce case by using a reverse application of the conventional EHAM system, such as is described above. That is, a man was fitted with an ankle bracelet (tag) of the type used in a conventional EHAM system. The monitor (FMD), instead of warning officials when the tagged individual left the home, was "recalibrated to ignore the husband's location unless he approached the home". In this way, the FMD would alarm if the husband was in the vicinity or entered the victim's home.

Others, desiring to better protect the victim from spousal abuse using a similar reverse application of a conventional EHAM system, have recently proposed legislation that would establish a Spousal Offender Surveillance Pilot Program. Under the proposed Pilot program, a defendant eligible for probation, who has a history of domestic violence or other conduct which leads a judge to believe the spouse or former spouse of the defendant may be in physical danger, may require the defendant, as a condition of probation, to wear an appropriate electronic surveillance or monitoring device. Such device is defined in the proposed legislation as "a tracking unit or transmitting system worn by the defendant which would set off an alarm in the home of the spouse or former spouse or upon their person if the defendant comes within a specified distance of the spouse's or former spouse's home or person." See proposed SB 1122 (Presley) as introduced before the Senate Committee on Judiciary, State of California, April 1991.

Unfortunately, using a reverse application of an EHAM system to monitor an abuser in this manner suffers from several drawbacks. In the first place, an EHAM system assumes that the person being monitored (the "offender") is cooperative and wants the EHAM system to work. That is, the offender has agreed to wear the transmitting tag and remain in a specified location(s) under house arrest in proximity to an FMD, or equivalent device, because by doing so, the offender avoids being locked up in a jail or prison. Hence, it is in the best interest of the offender to comply fully with the use restrictions associated with the tag and FMD in order to avoid incarceration. Also, the offender is (by virtue of the fact that he or she has been allowed to remain under house arrest, as opposed to being incarcerated in a jail or prison) generally not considered to be a violent person. Disadvantageously, neither of these assumptions is accurate for the typical abuser. That is, the typical abuser has not agreed to remain at a specified location, but will be moving freely about. Moreover, the typical abuser is by definition a violent person who may go to great lengths in order to "defeat" the system so that he or she can carry out his or her abusing tactics and activities. Accordingly, what is needed is an electronic monitoring surveillance system or method that can perform its surveillance or monitoring function even with uncooperative individuals who may be freely moving about, and who may be actively trying to defeat the system.

Still further, using an EHAM system in reverse (as proposed in the prior art) to monitor the whereabouts of an abuser may not provide adequate notice to the victim and/or the governmental authorities of the abuser's approach. This is because the range of the transmitting tag worn by the abuser is limited to only a few hundred feet (due to the size and power limitations of the transmitting tag). Thus, the reversed EHAM system provides only minimal advance warning to the victim that the abuser is in the vicinity. Hence, an FMD, or equivalent receiving device in the victim's home, or carried by the victim, is not able to receive the signal transmitted by the transmitting tag, and hence is not able to detect the abuser and notify the victim of such detected presence, until the abuser has effectively already made contact with the victim. The victim may thus not have sufficient warning to take the necessary steps to prevent further abuse. Moreover, even if the authorities are notified of the presence of the abuser at the victim's house, they may not be able to respond in sufficient time to prevent further abuse because by the time they receive such notification, the abusing activity may have already begun.

Furthermore, the electronic notice provided by a reversed EHAM system, regardless of whether it is received in sufficient time to prevent or warn the victim concerning the abuser's approach, would still not be sufficient to conclusively establish a violation of the protective order. That is, the receipt of an electronic signal from the FMD, by itself, would not provide the necessary evidence needed in a court proceeding in order to conclusively establish that a protective order has been violated. It may provide some evidence that could, when considered with other evidence, suggest the abuser was in violation of the protective order, but in most legal proceedings it could not conclusively establish such violation. All it would provide is an indication that a signal was received by the victim's FMD (or equivalent receiving device) that was the same or similar to a signal that should have been generated by a transmitting tag attached to the abuser. Corroborating evidence would still be required to conclusively establish that the abuser was, in fact, in contact with the victim, and not merely someone who had taken the abuser's tag, or someone who had a tag that functioned the same as the abuser's tag, or any other number of possibilities. What is needed, therefore, is an electronic monitoring system that automatically generates the requisite evidence of a protective order violation whenever the abuser does in fact violate such order.

SUMMARY OF THE INVENTION

The present invention advantageously addresses the above and other needs by providing an electronic monitoring system that monitors an abuser for compliance with protective orders; and that, when a violation does occur, automatically gathers evidence, independent of any that may be provided by the victim, to conclusively establish such violation.

The monitoring system of the present invention includes at least the following elements: (1) a transmitter tag worn by the abuser that transmits a unique identifying (ID) signal, either periodically or when triggered; (2) a receiving/monitoring device (RMD), or equivalent, carried by or positioned near the victim, e.g., in the victim's house for receiving the ID signal; and (3) a central monitoring computer at a central monitoring location that is in selective telecommunicative contact with the RMD, and that provides appropriate instructions to personnel or equipment at the central monitoring location or elsewhere in the event an abuser is detected at the victim's RMD. As explained more fully below, one embodiment of the invention may further include means for detecting and reporting any attempt to tamper with the transmitter tag or the victim's RMD; and another embodiment may include a field monitoring device (FMD), or equivalent, installed at the abuser's house for monitoring when the abuser exits and leaves his or her house.

In operation, if the abuser comes near the victim's RMD, which is typically installed in the victim's house or carried by the victim, the victim is notified by an alarm that is generated by the RMD. Simultaneously, or as soon thereafter as possible, the central monitoring computer is notified by an alarm signal that is generated by the RMD and communicated to the central monitoring computer through an established telecommunicative link, e.g., through the public telephone network. The central monitoring computer, upon receipt of the alarm signal, immediately retrieves and displays preapproved instructions contained in an on-line "response file". These instructions direct personnel and/or equipment at the central monitoring location to take appropriate action relative to the particular abuser whose presence at the victim's location has been detected. Such action may provide, for example, for the immediate dispatch of the police or other authorized personnel to the victim's location. At a minimum, such action would normally involve activation of evidence gathering equipment located at the victim's location, e.g., within the RMD, and/or located at the central monitoring station and coupled to the victim's location through the established telecommunicative link. In some instances, pertinent information contained in the response file may also be made available directly to the police or other authorized personnel in order to assist them as a response is made to an alarm signal. In some embodiments of the invention, the central monitoring computer, and the response file stored therein, may be coupled to or otherwise made part of the emergency "911" network, thereby providing this information to whatever agency needs it at the time.

The information in the response file may include, e.g., a description of the abuser, including a physical description and/or psychological profile; a description of his or her automobile; a brief history of prior violations of the abuser (i.e., the abuser's "record"), including an indication as to whether the abuser is likely to be armed; the type and term of the protective order, including the date the protective order was issued and the identify of the court that issued it; a description of the victim and his or her address, including the number of occupants at the victim's address; and the like.

In accordance with one aspect of the invention, the abuser, either with his or her consent, or as ordered by a court through a restraining (protective) order, is fitted with an electronic transmitter or tag. In one embodiment of the invention, the tag is identical or similar to that used in a conventional EHAM system, and periodically transmits an identification signal unique to that particular tag. If any attempt or act is made to remove or otherwise tamper with the tag (a "tamper event"), such tamper event is detected by appropriate sensing circuits within the tag. In response to a detected tamper event, the transmitting circuits within the tag generate and transmit a tamper signal. In another embodiment of the invention, the tag does not generate its identification signal unless triggered by a trigger signal, or unless a tamper event is detected.

In accordance with another aspect of the invention, the RMD installed at the victim's house, or otherwise positioned near the victim, is equipped with, or coupled to, evidence gathering devices, such as recorders, microphones, and/or video cameras. Suitable recording equipment, either within or coupled to the RMD, or at the central monitoring location, automatically records the audio and/or video signals that are generated by such devices for so long as the RMD detects the presence of the abuser at the premises of the victim. Such recordings advantageously provide conclusive evidence that the protective order has been violated.

It is noted that the continuous receipt of an ID signal at the RMD, which receipt is logged (stored) in the memory circuits of the RMD, further provides evidence that the protective order has been violated, with or without any other evidence that might be gathered and recorded by any other evidence gathering devices, such as microphones and/or video cameras.

A further aspect of the invention provides that in the event the victim takes the phone off hook, or in the event that the telephone line to the victim's house is cut or otherwise tampered with, the evidence gathering devices at the victim's location are automatically enabled. Information (data signals) obtained through such enabled evidence gathering devices, such as audio and/or video signals, and including receipt of the ID signal, are stored in suitable recording devices located at the remote location where the victim is located. In this way, evidence is gathered at the remote site even though the telecommunicative link with the central monitoring location may be temporarily unavailable.

In accordance with yet another aspect of the invention, a field monitoring device (FMD), or equivalent, may be installed at the house of the abuser. Such FMD would function in conventional manner, and would detect whenever the presence or absence of the abuser at his or her residence, including when the abuser exits his or her residence. Moreover, such FMD would detect any tamper event that occurs in connection with the transmitter tag that has been assigned to the abuser, at least insofar as such tamper event occurs within range of the FMD at the abuser's house.

In accordance with still another important aspect of the invention, used with some embodiments thereof, any tamper event that occurs anywhere within a wide area radio communications (WARC) region, e.g., a metropolitan area or other geographic area covered by a satellite system or other RF technology, is detected and communicated to the central monitoring computer at the central monitoring station. The occurrence of a tamper event may be detected or deduced by either receipt of an ID signal (having a portion thereof modified to indicate the detection of a tamper event) anywhere within the WARC region, or by noting the absence of the receipt of an ID signal when an ID signal had been previously received on a regular basis. Hence, any attempt by the abuser to remove or otherwise tamper with the transmitter tag, regardless of where the abuser may be within the WARC region when the tamper event occurs, is still detectable by the system.

The invention may thus be characterized as an electronic monitoring system adapted to monitor compliance of a protective order. Such protective order is imposed, as indicated above, to restrain a first person from abusing a second person. A first embodiment of the electronic monitoring system includes at least the following elements: (1) a transmitter tag; (2) a monitoring device; (3) evidence gathering means; and (4) a central processing unit (CPU) or computer.

The transmitter tag in accordance with this first embodiment includes transmitting means for periodically transmitting a first identification signal over a limited range. The transmitter tag also includes means for securely attaching the transmitter tag to the first person (the one being monitored, e.g., the abuser), whereby the first identification signal generated by the transmitter tag uniquely identifies the first person to whom the transmitter tag is attached.

The monitoring device in accordance with this first embodiment is located proximate the second person (the one who is not to be contacted by the first person, e.g., the victim). For example, the monitoring device may be installed in the house of the second person, the work place of the second person, or carried by the second person. This monitoring device includes: (a) receiving means for receiving the first identification signal whenever the transmitter tag, and hence whenever the first person to whom the transmitter tag is attached, comes within the limited range of the monitoring device; (b) verification means for verifying that the first identification signal comprises the identification signal that is transmitted by the transmitter tag attached to the first person; and (3) means responsive to the verification means for promptly establishing a telecommunicative link with the CPU located at a central monitoring location remote from the monitoring device, and for sending to the CPU a notifying signal through the established telecommunicative link indicating that the first identification signal has been received and verified by the monitoring device. In this way, the CPU is put on notice that the transmitter tag, and hence the first person to whom the transmitter tag is attached, has come within the limited range of the monitoring device. This thus provides a first indication that the first person has likely violated the protective order.

As needed or required for a particular victim's house or workplace, one or more repeater circuits ("repeaters") may be selectively positioned around the victim's house or workplace in order to extend the range over which the abuser can be detected. Such repeaters each include a receiver that "picks up" (receives) the first identification signal, verifies that it is a valid identification signal, and retransmits the signal after a short delay (e.g., a few seconds) so that it can be received by the receiving means within the monitoring device. One repeater, for example, may be placed in the front yard of the victim, and another repeater may be placed in the back yard of the victim. In this way, the abuser's approach may be detected before he or she actually arrives at the victim's premises.

The evidence gathering means in accordance with this first embodiment is coupled to the monitoring device and is responsive to, i.e., its operation is activated or triggered by, the verification means. When activated, the evidence gathering means automatically gathers evidence from a zone surrounding the monitoring device. This evidence helps to conclusively establish the identity of any person who enters the zone. The evidence gathering means may include simply means for logging (storing) the continued receipt of the identification signal. In addition, the evidence gathering means may include other devices, such as a microphone and audio recorder, and/or a video camera and video recorder. For some applications, a portion of the evidence gathering means, such as the recorder portion (or equivalent device that stores whatever signals are sensed near the monitoring device), may optionally be located at the central monitoring location, with the evidence gathered at the monitoring device being relayed thereto through the established telecommunicative link. In this way, a violation of the protective order by the first person may be established through evidence gathered by the evidence gathering means.

Further, operating personnel at the central monitoring location are put on notice whenever it appears the first person is near the second person, thereby allowing such personnel to take whatever action is deemed appropriate in order to most effectively gather evidence of the protective order violation, and in order to best protect the second person. As indicated above, such action may advantageously be guided by instructions and other information that the CPU automatically retrieves from a pre-stored data base, or "response file", and displays to the operating personnel. The information contained in the response file is "personalized" to fit the personality and other known traits of the first person, and may also provide selected information relative to the second person. For example, the response file may contain a list of prior arrests or convictions of the first person (abuser); an indication as to whether the first person is likely to be armed; a description of the first person's automobile; detailed information concerning the protective order, including its date of issuance, its term, and court from which issued; a description of the second person (victim); the victim's address; and identification of victim advocates, victim family members, probation officers, or other parties who should be contacted in the event the protective order is violated. Advantageously, some or all of the information contained in the response file can be immediately made available to the police or other law enforcement agencies who may be dispatched to the victim's address.

A second embodiment of the invention, also directed to an electronic monitoring system for monitoring compliance with a protective order, includes at least the following elements: (1) a triggerable transmitter tag worn or carried by the first person, e.g., the abuser; (2) a transceiver monitoring device placed on or near the second person; and (3) a central processing unit (CPU) or computer at a central monitoring location that may be some distance from the second person.

The triggerable transmitter tag in accordance with this second embodiment includes: (a) receiving means for receiving a trigger signal, and (b) transmitting means for transmitting a first identification signal over a first range, e.g., 250–500 feet, in response to receipt of the trigger signal.

The transceiver monitoring device in accordance with this second embodiment includes transmitting means for periodically transmitting the trigger signal over a second range surrounding the monitoring device. This second range will typically be greater than the first range over which the transmitting means of the transmitter tag transmits the first identification signal. For example, the second range may be up to one-half mile. In this way, the transmitter tag is triggered to begin transmission of the first identification signal whenever the transmitter tag, and hence whenever the first person carrying the transmitter tag, comes within the second range of the monitoring device.

The transceiver monitoring device also includes receiving means for receiving the first identification signal whenever the transmitter tag, and hence whenever the first person carrying the transmitter tag, comes within the first range of the monitoring device. Further included within the transceiver monitoring device are means responsive to the receipt of the first identification signal for promptly establishing a telecommunicative link with the CPU located at the central monitoring location, and for sending to the CPU a notifying signal through the established telecommunicative link indicating that the first identification signal has been received by the monitoring device. In this way, the CPU is put on notice that the triggerable transmitter tag, and hence the first person who is carrying the transmitter tag, has come within the second range of the monitoring device. Such notice thus indicates that the first person has likely violated the protective order. Further, in this way, the triggerable transmitter tag does not transmit its identification signal until the first person comes within the first range of the monitoring device, thereby preserving the limited energy of the batteries within the triggerable transmitter tag.

Additionally, if warranted, this second embodiment of the invention may also include one or more evidence gathering devices coupled to the transceiver monitoring device, similar to the first embodiment. When used, evidence may thus be automatically gathered from the immediate area surrounding the transceiver monitoring device (i.e., from the immediate area surrounding the second person) in the event that the first identification signal is received.

A third embodiment of the invention may be characterized as a method for electronically monitoring compliance with a protective order. Such method includes the steps of: (a) attaching a transmitter to a first person who has been ordered not to make contact with, or otherwise abuse, a second person under the protective order, this transmitter including circuitry for periodically transmitting an identification signal over a limited range; (b) placing a receiver near the second person, this receiver including circuitry for receiving and verifying the identification signal transmitted by the transmitter attached to the first person; (c) placing at least one evidence gathering device near the receiver, this evidence gathering device including circuitry for automatically activating its operation upon the receipt and verification of the identification signal by the receiver; and (d) establishing telecommunicative contact with a central processing unit (CPU) at a central monitoring location remote from the receiver in the event the identification signal is received and verified by the receiver, and notifying the CPU through the established telecommunicative link that the identification signal has been received. Thus, in this way, the monitoring personnel at the central monitoring location are alerted that the first person may be near the second person. Further, evidence is automatically gathered to corroborate that the first person is near the second person.

It is thus a feature of the present invention to provide an electronic monitoring system that monitors a first person, e.g., an abuser, for compliance with a protective order that prevents the first person from "abusing" (as that term is broadly defined herein) a second person, e.g., a victim.

It is another feature of the invention to provide such a monitoring system that automatically gathers evidence of a violation of the protective order by the first person, thereby facilitating the effective enforcement of the protective order.

It is yet another feature of the invention to provide a monitoring system wherein an abuser is electronically monitored for compliance with an order not to contact a victim, and wherein advance notice is automatically provided to the victim in the event the abuser comes near the victim. Such advance notice thereby affords the victim some opportunity to prepare for or avoid such contact with the abuser.

It is an additional feature of the invention, in some embodiments, to provide such a monitoring system wherein the range over which an abuser can be detected relative to the victim is extended through the judicious use and placement of repeaters placed around the victim's premises.

It is another feature of the invention to provide such a monitoring system wherein such advance notice is also provided to a central monitoring location, whereat such notice serves to alert law enforcement or other personnel to take appropriate action in order to best enforce the protective order.

Another feature of the invention is to provide a central processing unit (CPU), or equivalent device, at the central monitoring location that processes and/or logs all the communications that take place between the CPU and an appropriate monitoring device placed on or near the victim. In some embodiments of the invention, this CPU may be coupled to, of form part of, an emergency communications network, such as the "911" telephone network.

It is still another feature of the invention to provide such a monitoring system that automatically provides instructions and other information to operating personnel at the central monitoring location relative to how they should proceed to best enforce the protective order once the abuser is detected as being near the victim. Such instructions are included in a "response file" stored at, or coupled to, the CPU. A related feature of the invention makes these instructions and other information readily available to law enforcement officers, or other personnel, who may not be at the central monitoring location, but who nonetheless play an active role in the enforcement of the protective order.

It is yet a further feature of the invention to provide such a monitoring system wherein the abuser is fitted with an electronic transmitter that periodically, or when triggered, generates a unique identification signal that is assigned to the abuser. It is an additional feature to provide detection means within such electronic transmitter that detects any attempt by the abuser to dissociate himself or herself from the transmitter, and that alerts the monitoring personnel of such attempt.

It is also a feature of the invention to provide such a monitoring system that is fully compatible with existing electronic house arrest monitoring (EHAM) systems.

Another feature of the invention is to provide such a monitoring system that may be readily integrated with an emergency "911" telephone communications network.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
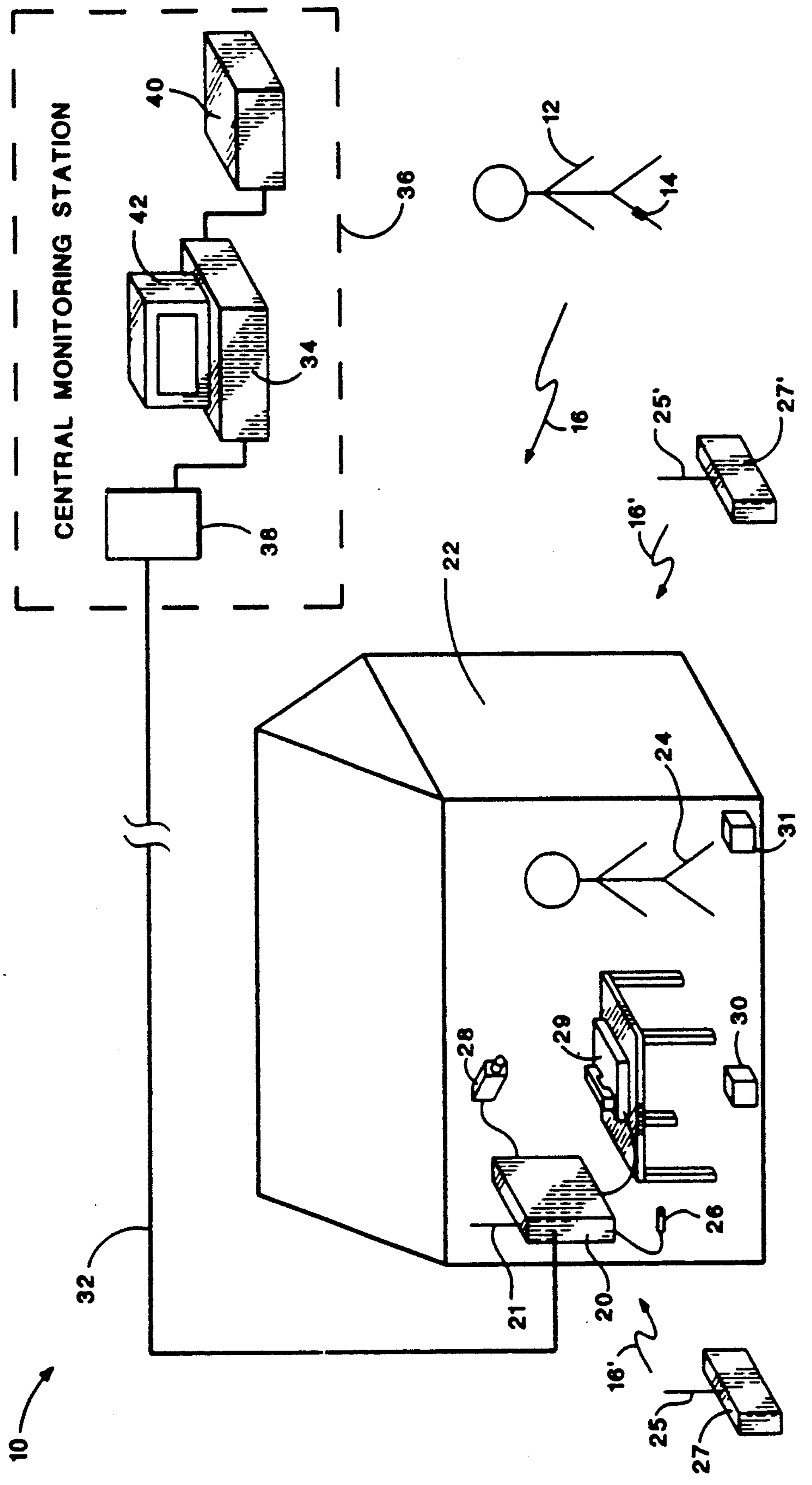
FIG. 1 diagrammatically illustrates the main elements of an electronic monitoring system made in accordance with a first embodiment of the invention.

Referring first to FIG. 1, the main components of an electronic "no-contact" monitoring system 10 made in accordance with the present invention are diagrammatically shown. An abuser 12 is fitted with an electronic tag 14. This tag may be placed anywhere on the body of the abuser, but is typically fitted around the ankle. Advantageously, the tag 14 may be the same as or similar to the tags worn by an offender in a typical EHAM system, as described in the aforecited patents. That is, the tag 14 includes a transmitter that periodically (e.g., every 30–120 seconds) transmits a unique identification (ID) signal at low power, as allowed by applicable law. This ID signal is receivable over a range of about 150–250 feet. Such identification signal is symbolically depicted in FIG. 1 as a wavy arrow 16, and may hereafter be referred to as the ID signal 16. A Receiving/Monitoring Device (RMD) 20 is placed in the residence, work place, or other location 22 of a victim 24. While the RMD 20 is normally mounted or installed within the residence and/or work place 22 of the victim 24, as shown in FIG. 1, it is to be understood that some versions of the RMD may also be portable, allowing the RMD 20 to be carried by the victim, e.g., in a shoulder least one repeater circuit 27. The repeater circuit 27 is positioned near, but not necessarily inside of, the residence 22 of the victim 24. For example, the repeater circuit 27 may be positioned outside in the front yard of the victim's premises, or near the front door. Alternatively, the repeater circuit 27 could be positioned on the roof of the victim's premises. An additional repeater circuit 27' may be positioned in the back yard of the victim's premises, or in another strategic location that will help sense the approach of the abuser 12 towards the victim's residence or other place of abode or work. As many additional repeater circuits as are required may likewise be positioned around the location of the victim in order to sense the approach of the abuser 12.

Each repeater circuit 27 or 27' includes an antenna 25 or 25' coupled to a receiver circuit included within the repeater circuit. This receiver circuit is designed to receive the ID signal 16 transmitted from the tag 14 worn by the abuser. Once received, the repeater circuit verifies that the ID signal 16 is a valid ID signal, and then retransmits an ID signal 16', after a short delay of, e.g., a few seconds, which ID signal 16' contains the same information, formatted in the same way, as was contained and formatted in the ID signal 16 transmitted from the tag 14. Advantageously, however, the retransmitted ID signal 16' may be transmitted at higher power, if desired. Further, the repeater circuits may be positioned to have and maintain optimum radio contact with the RMD 20, thereby enabling the ID signal 16' to be received at the RMD 20 without significant noise or other interference. In this manner, the RMD 20 is advantageously able to detect the approach of the abuser 12 even before the tag 14 worn by the abuser is within range of the receiver circuit within the RMD. bag or on the person, when the victim leaves the residence 22. For example, a portable RMD may take the form of a paging device that is carried in a pocket or attached to a belt.

The RMD 20 receives the ID signal 16 only when the abuser 12 comes within range of the RMD. An antenna 21 located on the RMD facilitates receipt of the ID signal. The range of the RMD 20 is a function of the power contained within the ID, as well as the sensitivity and positioning of the antenna 21. Typically, for a conventional transmitter tag of the type used with existing EHAM systems, this range is on the order of 150–250 feet.

As soon as the tag 14, and hence as soon as the abuser 12, comes within range of the RMD, the ID signal is received by the receiving circuits within the RMD. The RMD is programmed to recognize only the ID signal 16 transmitted by the transmitter tag 14 assigned to a particular abuser 12 who has a history of abusing the victim 24. Thus, the RMD distinguishes a valid ID signal from an invalid ID signal or noise. Typically, the ID signal 16 comprises an RF signal, having a specific carrier frequency, modulated with one or more bytes of digital data. Thus, verification of the ID signal 16 is accomplished by receiving only signals of the correct frequency, demodulating such signals to recover the digital data encoded therein, and comparing the digital data with pre-programmed valid data. This process of receiving and verifying only valid ID signals is similar to that used to by conventional automatic garage door opener circuits that are programmed to respond only to a valid control signal from a hand-held transmitter.

In order to increase the range over which the RMD 20 may detect the approach of the abuser 12, some embodiments of the invention contemplate the use of at That is, so long as the tag 14 is within range of one of the repeater circuits 27 or 27' (or any other repeater circuit that might be used), the ID signal 16 is picked-up by such repeater circuit and relayed to the RMD 20. The RMD 20, as described more fully below, thus responds to the receipt of either the ID signal 16 or the retransmitted ID signal 16' (the RMD circuits do not distinguish between the ID signal 16 or the ID signal 16'; such circuits are simply programmed to recognize the receipt of a valid ID signal from a tag or from a repeater) so as to alert the victim 24, and to notify the central monitoring station 36, of the detected approach of the abuser 14.

The repeater circuit may be constructed substantially as shown in U.S. Pat. No. 4,918,432 (Pauley et al.), col. 20, line 60 through col. 21, line 29, and FIG. 17, which patent is incorporated herein by reference.

In most instances, receipt of a valid ID signal over a prescribed period of time provides sufficient evidence to establish probable cause that the protective order has or is being violated. Such evidence may be bolstered, however, through the use of a microphone 26 coupled to the RMD 20, which microphone is activated (turned on) whenever the RMD receives a valid ID signal 16. The use of the microphone 26 thus allows for the selective monitoring of audio sounds. Such sounds, when recorded or otherwise observed, thus provides additional evidence to conclusively establish the violation of the protective order. Some embodiments of the system 10 also include a video or other camera 28 that takes and/or records pictures of objects or persons who enter the residence 22 of the victim 24. Such camera 28, when used, is typically enabled (made ready to take a picture) by the RMD 20 upon receipt of a valid ID signal. Appropriate sensors 30, 31, strategically placed within the residence 22 of the victim, sense when another person enters the residence 22 and generate a trigger signal that activates the camera 28.

Upon receiving a valid ID signal 16 or 16' (hereafter, it is to be understood that reference to the ID signal 16 also includes the retransmitted ID signal 16'), the RMD 20 generates an alarm that notifies the victim 24 of the imminent approach of the abuser 12. Such alarm may be audio, e.g., beeps, and/or visual, e.g., a flashing light, or other appropriate warning signals. The receipt of a valid ID signal 16 also activates the microphone 26, enables the camera 28, and activates or enables any other desired monitoring equipment at the victim's residence. The signals generated by such monitoring equipment, whether audio signals, video signals, or other types of signals (e.g., the receipt of the ID signal itself), are stored for later examination. The storing of these signals is accomplished through the use of memory devices and circuits within the RMD, or by a conventional recording devices, such as tape recorders. As is commonly used in the art, the camera 28 may comprise a video camera that includes a built-in microphone and recorder, with both the video and audio signals being combined on the same tape.

Receipt of a valid ID signal 16 further causes the RMD 20 to immediately establish a telecommunicative link with a central processing unit (CPU) 34 at a central monitoring station 36. Such link may be established, e.g., through a public telephone network, represented symbolically in FIG. 1 as a single line 32 that connects the RMD 20 with a modem 38, which modem 38 is connected to the CPU 34. The telephone network 32 is also connected to a standard telephone 29 at the victim's residence. The manner in which telecommunicative contact is established between two remote devices is well known in the art, and is commonly practiced, e.g., in the EHAM systems known in the art. Other types of telecommunicative links may also be used, in addition to, or in place of, a public telephone network. For example, a cellular telephone link may be used, in which case the RMD 20 may be portable, and carried with the victim anywhere that the victim should choose to go. Other types of telecommunicative links that may be used with the system 10 include cable TV systems, satellite communication networks, radio communication systems, and the like.

Upon establishing a telecommunicative link 32 between the RMD 20 and the CPU 34, the RMD provides an identification signal to the CPU that identifies both the victim and the abuser. The victim's identity is programmed into the RMD 20, there typically being a separate RMD 20 assigned to each victim. The abuser's identity is ascertained from the received ID signal 16. The CPU 34 at the central monitoring station 36 maintains a history file of the victim's location, as well as pertinent facts about the victim and the abuser. This information is retrieved and displayed, along with other pertinent instructions, at the central monitoring station 36 on the screen of a monitor 42. Alternatively, and/or conjunctively, such information may be printed by a printer 40.

Further, in some embodiments, any sounds picked up by the microphone 26, or any other signals picked up at the victim's location 22, are transmitted to the central monitoring station 36 through the established telecommunicative link 32. There, these sounds may be amplified for listening, and will usually also be recorded (for evidentiary purposes). The recording of the sounds may take place at the victim's location 22, at the central monitoring location 36, or both locations. Individuals trained in domestic violence intervention listen to the monitored sounds at the central monitoring station, and, if deemed necessary, dispatch police or undertake other action as necessary or as directed by the on-screen instructions. In some instances, it may be desired to have the CPU 34 programmed to automatically contact the nearest law enforcement agency, e.g., through the use of an automatic dialer device included within the CPU 34 or modem 38, upon receipt of a signal that indicates a valid ID signal 16 has been received at the RMD 20. Such contact may be accomplished through an emergency "911" telephone network, through a conventional telephone network, or through an appropriate rf communications link. This automatic contact may advantageously provide the law enforcement agency with an indication of the location where a potential violation of the protective order is occurring, as well as other information from a response file maintained at the central monitoring location. The information in such response file assists the law enforcement agency as it attempts to assure compliance with the protective order, such as the identity of the abuser, his or her propensity for violence, and other information as previously described. Hence, in this manner, an automatic dispatch of police or other law enforcement officers to the victim's residence 22 is quickly realized, and such police (or other officers) are dispatched with the most relevant information to help enforce the protective order.

Figure 2:
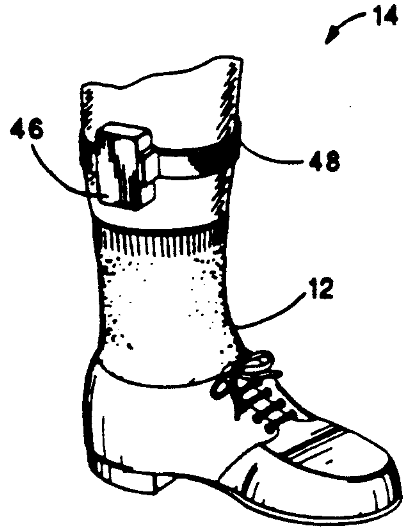
FIG. 2 pictorially illustrates the transmitter tag of the invention fitted on the ankle of an abuser.

Referring next to FIG. 2, there is shown a pictorial illustration of the transmitter tag 14 secured to the ankle of an abuser 12. The transmitter tag 14 includes a sealed housing 46, inside of which there is a suitable transmitter circuit that periodically generates and transmits the ID signal 16. The housing 46 is securely attached to the ankle of the abuser using a strap 48 that cannot be opened without being detected. If the strap 48 is opened or otherwise broken, or if the housing is otherwise removed from off of the abuser's ankle, then a "tamper event" is detected by appropriate sensing circuits within the tag 14. In such instance, one or more "tamper bits" are set within the ID signal 16. Advantageously, the design of the transmitter tag 14 may be the same as is used in the EHAM systems known in the art. See, e.g., U.S. Pat. Nos. 4,918,432 or 4,777,477.

Alternatively, the transmitter housing 46 and corresponding strap 48 may be made from very strong indestructible material. The strap could be adjustable, so that it can be easily fitted onto its wearer. However, once adjusted and locked, it cannot be broken or cut absent very expensive or elaborate equipment, such as bolt cutters or cutting torches, which equipment could not be used while the device is still fastened to the ankle of its wearer without inflicting severe harm or injury to the wearer.

Figure 3:
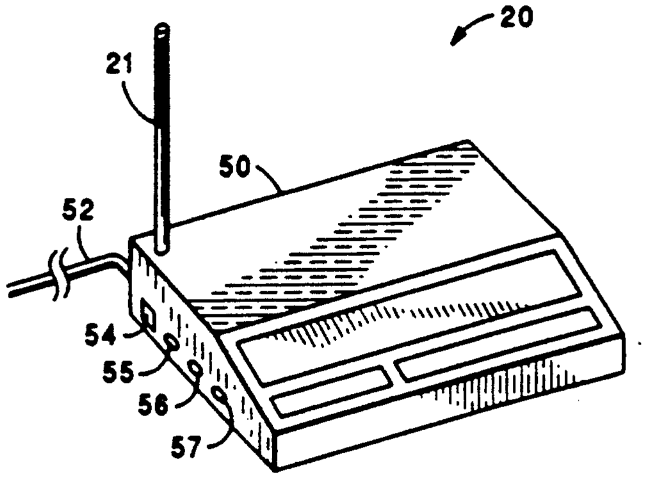
FIG. 3 similarly illustrates the monitoring device used with the invention.

Referring next to FIG. 3, a pictorial representation of one embodiment of the RMD 20 is shown. In general, the RMD circuits are housed in an attractive, yet ruggedized housing 50. Included in the RMD housing 50 are the RMD circuits, including a battery to provide back-up operating power. A power cord 52 normally provides the operating power for the RMD, which power cord may be attached to a conventional AC power plug. Various connectors are provided along one side or back of the housing 50 to provide needed connections with the RMD circuits. For example, a first connector 54 may receive a conventional telephone line quick-disconnect connector, allowing the RMD to be connected to a standard telephone line. A second connector 55 may provide a video input jack into which the video camera 28 may be connected. A third connector 56 may likewise provide an audio input jack into which the microphone 26 may be connected. A fourth connector 57 may provide various trigger and control signals for activating the evidence gathering devices, such as the video camera 28; and may further provide means for receiving inputs from other sensors, such as from the sensors 30, 31 (FIG. 1) that sense the entry of a person into the victim's residence 22. Such sensors may be of conventional design, e.g., of the type used to detect burglars, such as optical, infrared, and/or motion sensors. Suitable detection circuits within the RMD detect any attempt to remove or replace the devices that are connected to these connectors 54–57, which attempts are interpreted as a tamper event. Other circuits within the RMD detect any attempts to unplug, move, or open the RMD, thus providing a means for detecting other types of tamper events that occur to the RMD.

Significantly, there are no operator controls on the RMD 20 that require manual or other intervention. That is, the RMD 20, once installed, requires no manual input from the victim 24 in order to operate. This is an important feature because sometimes the victim, through fear or intimidation, will not do anything that might upset the abuser. Further, if the RMD 20 required turning on, the victim might forget to turn it on. Advantageously, however, the RMD of the present invention performs its monitoring function regardless of what the victim may or may not do. Further, as indicated above, the RMD detects tamper events that may be committed against the RMD, regardless of whether such tamper events are committed by the victim, the abuser, or some other person. A detection of RMD tamper event is communicated to the central monitoring location. Such detection of an RMD tamper and communication thereof to the central monitoring location may be accomplished in the same manner as is used in a field monitoring device (FMD) of an EHAM system, as described in the previously cited patents.

The RMD 20 may be constructed substantially in the same manner as is shown in the previously cited Pauley et al. patent for the Field Monitoring Device (FMD). Such FMD is essentially a microprocessor-based system that includes a receiver circuit for receiving the ID signal, a microprocessor, and appropriate memory circuits and clock circuits for logging the various times when the ID signal is received (or not received). Tamper detection circuits are also included. The only hardware modifications needed in the RMD 20 that may not be included in the FMD are the inclusion of an appropriate trigger circuit that may be used to enable the evidence gathering devices, such as the microphone 26 and/or video camera 28. Such trigger circuit, when used, may be of conventional design.

Control of the RMD 20 is realized by a suitable "program" that controls the operation of the microprocessor contained therein. Such program is typically stored in ROM or EEPROM memory. A representative control program for use within the RMD 20 is described below in connection with the flow chart of FIG. 5.

Figure 4:
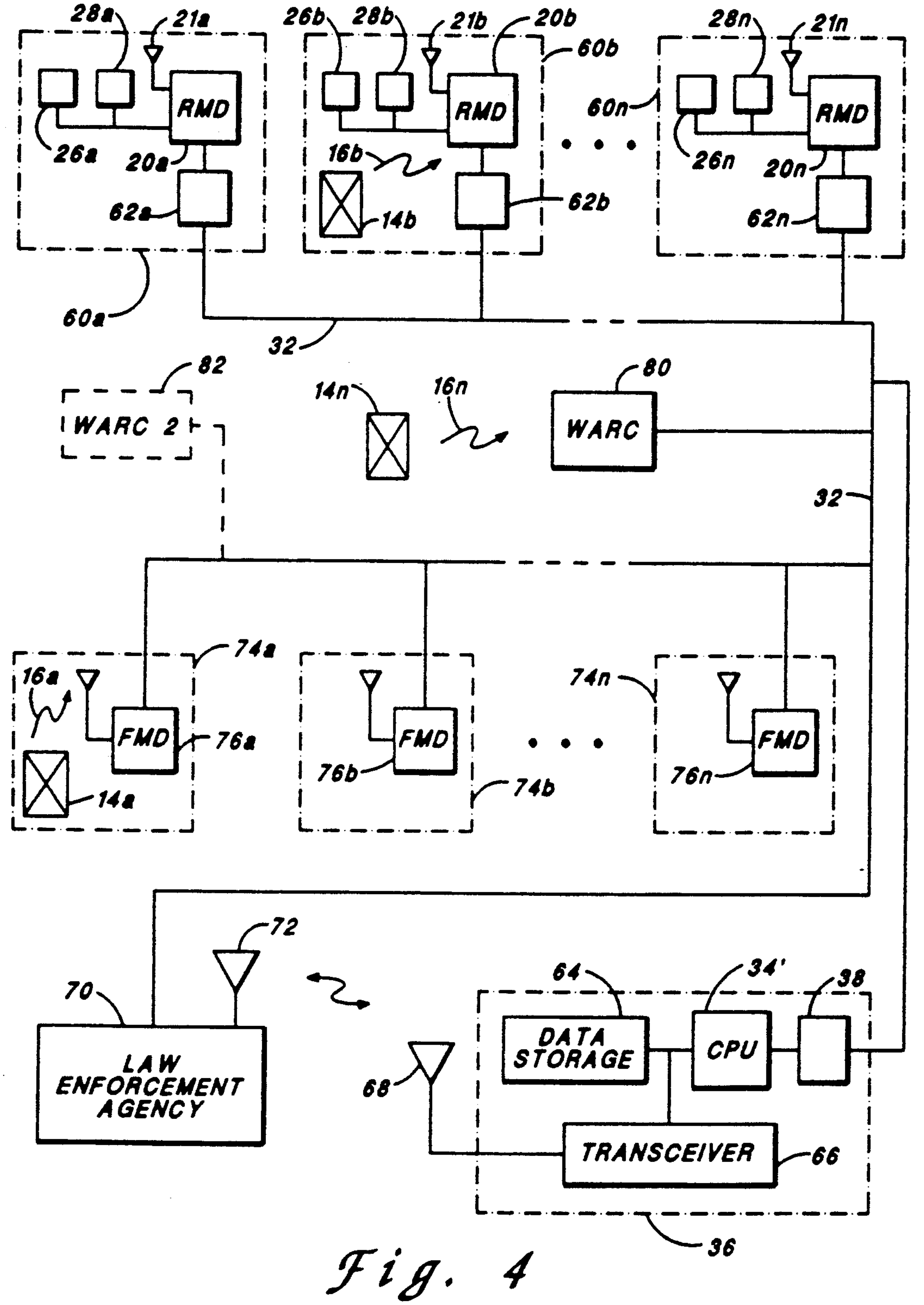
FIG. 4 is a block diagram of the invention illustrating its use with a plurality of potential victims and abusers.
Figure 5:
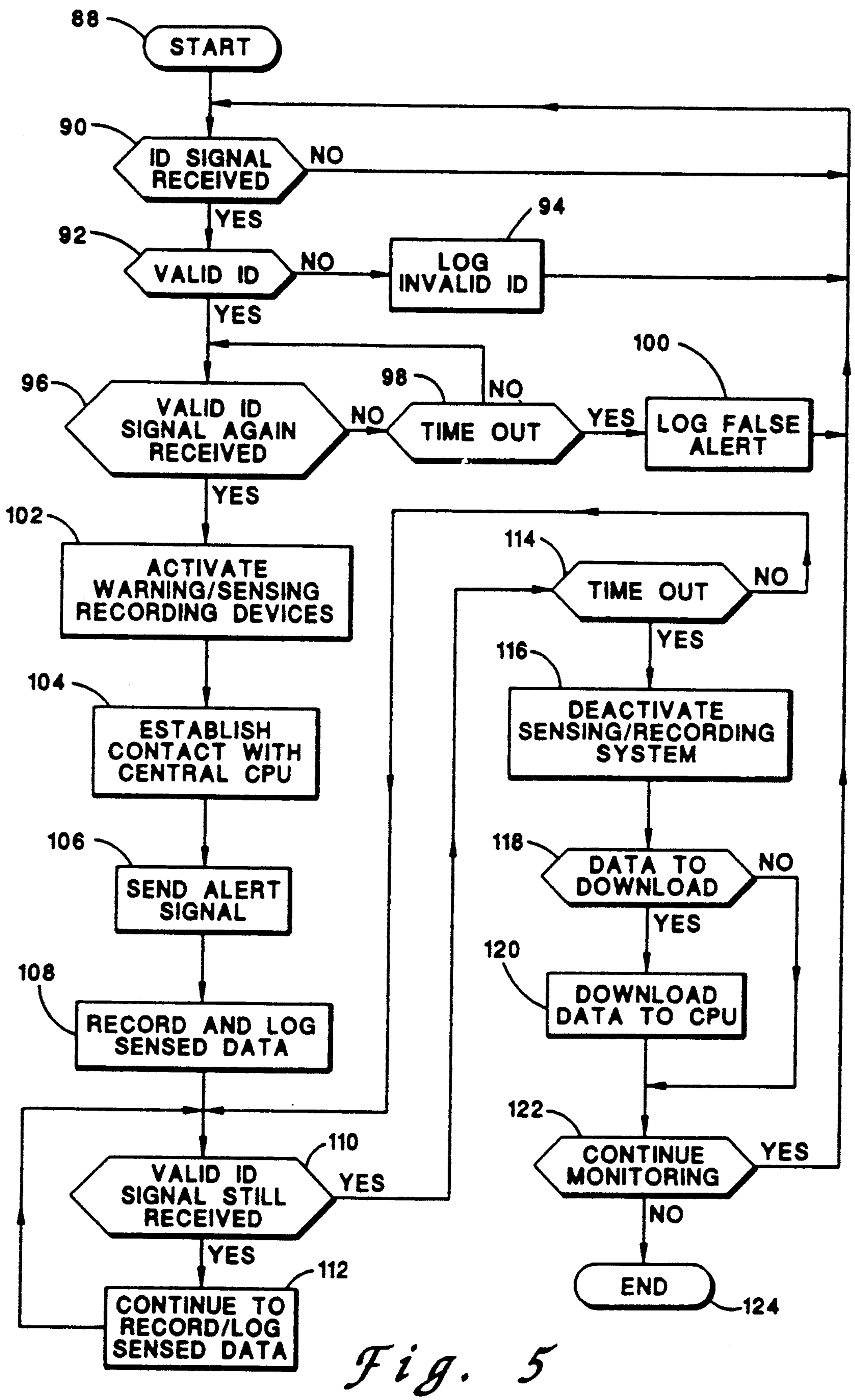
FIG. 5 is a flow chart illustrating the main operating program used within the monitoring device of the invention.

Before describing the RMD operating program as shown in FIG. 5, reference is made to FIG. 4 where there is shown a block diagram of the monitoring system 10 illustrating its use with a plurality of potential victims and abusers. As seen in FIG. 4, there is shown a plurality of remote monitoring locations 60*a*, 60*b*, . . . 60*n*, each of which may comprise the residence or work place of a potential victim. At each remote monitoring location, there is an RMD 20*a*, 20*b*, . . . 20*n*, each having a suitable antenna 21*a*, 21*b*, . . . 21*n* for receiving an ID signal. Also, at each remote monitoring location 60*a*, 60*b*, . . . 60*n* there is at least one evidence gathering device, such as a recorder, or a microphone 26*a*, 26*b*, . . . 26*n*, or a video camera 28*a*, 28*b*, . . . 28*n*. Further, coupled to each RMD is a modem 62*a*, 62*b*, . . . 62*n*, or equivalent interface device, that selectively connects the respective RMD to a telecommunicative link 32, such as a public telephone network. Other telecommunicative links may also be used, of course, such as private telephone networks, microwave links, rf links, cable TV, satellite communication links, and the like. For simplicity, no repeater circuits 27 or 27' (as shown in FIG. 1) are shown in FIG. 4. However, it is to be understood that such repeater circuits may be selectively positioned around and/or in each of the remote monitoring locations 60*a*, 60*b*, . . . 60*n*, as needed or desired.

The central monitoring station 36 is also coupled to the telecommunicative link 32. As was described above in connection with FIG. 1, a CPU system 34', including monitor and printer and any other desired peripheral devices, is coupled to the telecommunicative link 32 through a modem 38. Also coupled to the CPU system 34', or included as part thereof (but shown as a separate element in FIG. 4 for emphasis) is a data storage device (memory) 64, such as a magnetic hard disc drive or a tape drive. The CPU system 34' is configured so as to readily store and retrieve data to and from the data storage device 64. Further, the CPU system 34' may be connected (through appropriate interface circuits) to a transceiver circuit 66. The transceiver circuit 66, in turn, is coupled to an antenna 68. The transceiver circuit and antenna thus provide an alternate path for sending signals to and from the central monitoring station 36.

Also coupled to the telecommunicative link 32 is at least one law enforcement agency 70, or equivalent agency. The agency 70 is coupled to the standard telecommunicative link, which link may form part of an emergency "911" telephone network. Hence, either personnel and/or the CPU system 34' at the central monitoring location can communicate with the agency 70 over this telecommunicative link 32 to, e.g., inform the agency that a particular abuser has been sensed at a particular remote location where the abuser is not supposed to be, and to advise the agency of the information contained in the applicable response file for the particular abuser who has been sensed. The agency 70 can then respond to such notice in an appropriate manner, e.g., by dispatching needed assistance to the indicated remote location.

As shown in FIG. 4, the law enforcement agency 70 typically includes its own antenna 72 for sending and receiving radio communications to the field. Such antenna 72 may link with, for example, the antenna 68 of the central monitoring station, thereby providing an alternative communications link in addition to the telecommunicative link 32.

The present invention also contemplates that the abuser may be monitored in the same manner as other "offenders" are monitored using existing electronic house arrest monitoring (EHAM) systems. Hence, also shown in FIG. 4 are a plurality of remote locations 74*a*, 74*b*, . . . 74*n*, typically the residences or work places of one or more of the abusers. Each abuser is fitted with a conventional EHAM system tag 14*a*, 14*b*, . . . 14*n*. Each one of these tags transmits its own unique ID signal 16*a*, 16*b*, . . . 16*n* over a short range. A conventional EHAM system field monitoring device (FMD) 76*a*, 76*b*, . . . 76*n* is installed at each remote location 74*a*, 74*b*, . . . 74*n*. These FMDs are configured to receive and log the ID signals so long as the tag is within range of the FMD. Each FMD is further in selective telecommunicative contact with the central monitoring station 36 (or with another monitoring station) by way of the telephone network or other established telecommunicative link. Thus, the comings and goings of each abuser at their respective residences may be monitored in conventional manner, by noting whether or not the respective ID signal is received by the FMD, as is commonly done with EHAM systems known in the art.

Thus, in operation, if an abuser fitted with tag 14*a* is at location 74*a*, the tag transmits its ID signal 16*a*, which is received by FMD 76*a*. Should the abuser leave the location 74*a*, such fact is logged within the memory circuits of the FMD 76*a*, and may be reported to the central monitoring location. As soon as an abuser fitted with tag 14*b* enters or approaches the residence 60*b* of a victim that he or she has been ordered not to contact, the ID signal 16*b* is received by the RMD 20*b*, and the RMD issues an alarm indicating the detected approach of the abuser. The evidence gathering equipment 26*b* and 28*b* are then activated in an appropriate manner in order to electronically gather additional evidence to establish whether or not the abuser is present at the victim's residence (or other no-contact location) 60*b*. Further, in response to receiving a valid ID signal 16*b*, the RMD 20*b* initiates whatever action is required to open up the telecommunicative link 32 with the central monitoring station 36. Once this link is established, the RMD 20 provides notice to the CPU system 34' that the ID signal 16*b* has been received at the location 60*b*, thereby indicating that the abuser assigned tag 14*b* has likely violated the protective order. Then, appropriate action is taken by the CPU system 34', or personnel at the central monitoring location 36, as described above. Such action typically includes automatically retrieving data from the data storage device 64 that provides instructions to, or provides other data useful for, the operating personnel relative to the particular abuser fitted with tag 14*b*.

Further, in accordance with a preferred embodiment of the invention, each tag 14a, 14b, . . . 14n includes the ability to sense a "tamper event". A tamper event is defined as any attempt to remove or interfere with the operation of the tag or the FMD. If a "tamper event" is sensed, the tag signals such event, typically by setting a "tamper bit" (or a group of tamper bits) within the ID signal to a prescribed value, as described, e.g., in U.S. Pat. No. 4,952,913. Hence, the next time an ID signal is received wherein the tamper bits are set so as to signal a sensed tamper event, the FMD may, if so programmed, immediately contact the central monitoring station in order to report the occurrence of such tamper event. Thus, should the abuser tamper with the tag or FMD at his residence or other assigned location, i.e., within range of an FMD or RMD, such tamper event is detected and reported.

In accordance with some embodiments of the present invention, a tamper event may also be detected even if the abuser is not at his residence or other assigned location 74a, 74b, . . . 74n. Thus, for example, should the abuser fitted with tag 14n attempt to remove or otherwise tamper with such tag at a location that is not near an FMD or an RMD, the ID signal 16n, or equivalent signal, is still transmitted and detected by an appropriate wide area radio communications (WARC) medium 80. The WARC medium 80, in turn, is coupled to the telecommunicative link 32, and thus transfers the detected ID signal 16n to the CPU system 34'. The CPU system 34', in turn, is programmed to recognize any ID signals received over the telecommunicative link 32 as an indication that a tamper event has occurred to the specific tag identified by the ID signal. (It is noted that when the RMD or FMD communicates with the CPU system 34' over the telecommunicative link 32, the signals sent are conditioned appropriately to identify the source of such signals, e.g., the particular FMD or RMD from which the signal originates.)

Assuming that the tag 14 is within range of an FMD, RMD, or the WARC medium, i.e., regardless of the location of the tag, an ID signal should be received every time (or nearly every time) the ID signal is transmitted, regardless of the tags location, unless the tag has been tampered with. Thus, as an alternative method of detecting a tamper event, the CPU system 34' at the central monitoring location is programmed to look for receipt of an ID signal, whether received by an FMD, through the WARC medium 80, or by an RMD, at least once every 2-4 minutes, or other prescribed time period. The absence of the receipt of an ID signal during this prescribed time period, or for two or more consecutive such time periods, can thus be used to provide an indication that a tamper event has likely occurred.

Many types of WARC mediums 80 are available for use with the present invention in order to transfer to the central monitoring location 36 any tamper signals that are received anywhere within the medium. A few of these mediums are described below. In general, such WARC mediums cover a very large geographical area, e.g., a metropolitan area. As needed, a second WARC medium 82 may be used in conjunction with the first WARC medium 80, which mediums may have overlapping areas of coverage.

In general, a WARC medium used with the present invention will preferably provide wide area network coverage to a relatively large number of metropolitan areas, e.g., the top 50 metropolitan areas. Further, the WARC will provide fast access time, preferably less than ten seconds. For purposes of the present invention, it is preferred that the WARC medium be accessible for use at low cost. Further, it is desired that the transceiver used to interface with the WARC medium (i.e., the circuits included in the particular tag that is used with this embodiment of the invention) be manufacturable at relatively low cost, and that it operate at low power (e.g., less than 500 milliamps). Such transceivers should also be small in size, e.g., smaller than a package of cigarettes, and have low weight, e.g., less than 8 oz. with batteries, thereby allowing such transceivers to readily included within the transmitter tag housing.

Several WARC technologies are presently available that may be used with the present invention. One such technology is known as "ARDIS", which is a partnership of IBM and Motorola. ARDIS provides advanced radio data information service for interactive access to various computer data bases and information systems via two-way radio data terminals. The ARDIS service permits a device with a radio modem in the field to transmit and receive information via a radio carrier signal to the nearest of some 1100 radio base stations located across the country. Once received at one of these radio base stations, the information is then passed through the ARDIS nationwide network to the designated customer computer, all in a matter of seconds. Thus, in accordance with the present invention, the circuits in the transmitter tag 14 would include a radio modem that is capable of communicating with one of the radio base stations of the ARDIS network.

A further WARC technology is the RAM Mobile Data Network, which network is a direct competitor to the ARDIS system described above. The RAM Mobile Data Network shares the same advantages as the ARDIS network. Such networks are widely available in Europe, but at present are only available on a limited basis in the United States.

Another WARC technology available for use with the present invention is the cellular telephone network, particularly the digital improvements to the cellular network that are presently being made. Cellular networks are advantageously available nationwide.

An additional WARC technology that is gaining widespread acceptance is sponsored by International Teletrac. The International Teletrac systems have been designed to implement a stolen car locator system based on time-of-flight location techniques. The Teletrac systems couple a UHF pager with a 900 MHz spread spectrum transmitter. The system can either squawk when an emergency condition occurs or can be interrogated by the central site at will. A Teletrac system is currently deployed in the greater Los Angeles area, and is rapidly growing to other metropolitan areas. The UHF pager used with such a system may be readily incorporated into the transmitter tag 14 of the present invention in order to provide the desired sensing and reporting of a tamper event, as well as general tracking of the abuser.

Still a further WARC technology that may be used with the present invention is the ProNet Tracking system. The ProNet Tracking system is a radio location network that is similar to the one used by International Teletrac. It operates in the 220 MHz band and is primarily used, at present, by banks to track cash being transported by armored cars. As with the International Teletrac system, the ProNet Tracking system can squawk in case of an emergency, or be interrogated by a central facility. It is currently available in several cities, primarily in California and Texas. Its transceiver is small and lightweight, and can be leased for a modest monthly fee.

Yet an additional WARC technology that may be used with the present invention is a personal communication network (PCN). A PCN is essentially the next generation of a cellular telephone. Unlike cellular telephone systems, which use a small number of expensive cell sites that cover a wide area, a PCN uses a large number of low cost, widely distributed "microcells". It is estimated that there will be over 50 million users of PCNs by the year 2000, both consumer and commercial. Transceivers used with the system are very small, and are available at a modest cost.

A further WARC technology that may be used with the invention is a Low Earth Orbit Satellite (LEOS). A LEOS is effectively an alternative to a PCN for the same level of service. Instead of using land-based "microcells", however, a LEOS system utilizes a number of small satellites in low earth orbit. These satellites orbit a few hundred miles above earth, as compared to geostationary satellites that orbit about 22,000 miles above earth and are employed for telephone and television transmission. Because LEOSs are closer to the earth's surface, they are able to function with transceivers that use very small antennas and low power. The present manufacturers and/or designers of LEOS systems are Motorola and American Mobile Satellite, although others may enter the LEOS market soon.

Any or all of the above-described WARC systems, or variations thereof that are yet to be developed, may advantageously be used with the present invention. The key aspect of a WARC system used with the invention is that it cover a sufficiently large geographical area with some type of means to receive low power radio transmissions, and that it be able to interface such signals, once received, to the central monitoring station used with the invention, e.g., through an existing telecommunicative network.

Referring next to FIG. 5, a flow chart of the main operating program used within the remote monitoring device (RMD) of the invention is shown. In this flow chart, each main step is depicted as a "box" or "block", with each block having a reference numeral. Those skilled in the art of microprocessor programming can readily write appropriate code to achieve the main steps illustrated in the flow chart of FIG. 5.

As seen in FIG. 5, once the program is started (block 88), e.g., by applying power to the RMD, the program looks for the receipt of an ID signal (block 90). If an ID signal is not received, the program simply "waits" until an ID signal is received. If an ID signal is received, then a determination is made as to whether such ID signal is a valid ID signal (block 92). As explained previously, this is accomplished by demodulating the received ID signal and examining the sequence of bits therein to determine if it is a valid sequence. If the ID signal is not valid, then such event (the receipt of an invalid ID signal) is logged (block 94). While the receipt of an invalid ID signal may simply evidence the receipt of a spurious signal or noise, it may also indicate a malfunction or misadjustment of the receiving circuits. Hence a large number of logged invalid ID signals may provide a basis for checking the operation of the RMD.

If the receipt of a valid ID signal is confirmed (block 92), then an appropriate test is next performed to positively verify that a valid ID signal was actually received. Typically, this is done, as shown in FIG. 5, by waiting to receive a valid ID signal a second time (block 96). If the abuser is near the RMD, a second valid ID signal should be transmitted within the next 30–120 seconds. Thus, a time window is started after receipt of the first valid ID signal, and if a valid ID signal is not received before the time window times out (block 98), e.g., within 3–4 minutes, then a false alert is logged (block 100). A large number of false alerts may further provide an indication that the RMD is malfunctioning.

Should a valid ID signal be received again (block 96) before the time out (block 98) of the time window, then the warning/sensing devices coupled to, or included within, the RMD are activated (block 102). Such devices will typically include at least a recorder (or equivalent) to record the number of times a valid ID signal is received, including the time of day when such signals are received. Such devices may also include a microphone, and perhaps a video camera. Once these devices are activated, appropriate telecommunicative contact is established with the central monitoring station (block 104). Usually, this is done by establishing contact with the public telephone network through a modem, and activating an auto-dialer program within the RMD that dials the telephone number of the CPU at the central monitoring location.

Once telecommunicative contact is established with the CPU, an appropriate alert signal is sent to the CPU (block 106) through the established telecommunicative link. Further, the signals (e.g., audio and/or video) that are sensed by the sensing devices coupled to the RMD, are recorded and/or logged. Such recording may be done using recording equipment located at the remote monitoring location or at the central monitoring location. Typically, audio signals may be readily passed through the established telecommunicative link and recorded and/or monitored (listened to) at the central monitoring location. Video signals, on the other hand, will typically be recorded at the remote monitoring location due to the limited bandwidth of a conventional telephone communication link. (However, some types of telecommunicative links, such as satellite communication links, have a sufficiently wide bandwidth to allow the higher frequency video signals to be readily transferred therethrough.)

After the telecommunicative link is opened between the RMD and the central monitoring station, an appropriate decision is made as to how long this link should remain open. Typically, this is done by monitoring whether valid ID signals are still being received (block 110). As long as a valid ID signal continues to be received, the data sensed by the sensors at the remote location (e.g., microphones and/or video cameras) continues to be recorded and/or sent to the central monitoring station (block 112), and the telecommunicative link remains open. If, however, after the time out of a prescribed time window (block 114) a valid ID signal is not received (blocks 110, 114), then the sensing and recording devices are deactivated (block 116), and a decision is made as to whether there is any data to download to the CPU at the central monitoring location (block 118). If so, such data is downloaded to the CPU (block 120) through the still opened telecommunicative link.

In either event (data downloaded or not), a decision is next made as to whether monitoring is to continue (block 122). Typically, this is a programmable option that may be controlled from the CPU at the central monitoring location. Normally, monitoring will continue, and the RMD again looks for the receipt of an ID signal (block 90). In some instances, it may be desirable to shut down the RMD, e.g., for diagnostic testing, in which case the main program ends (block 124).

Figure 6:
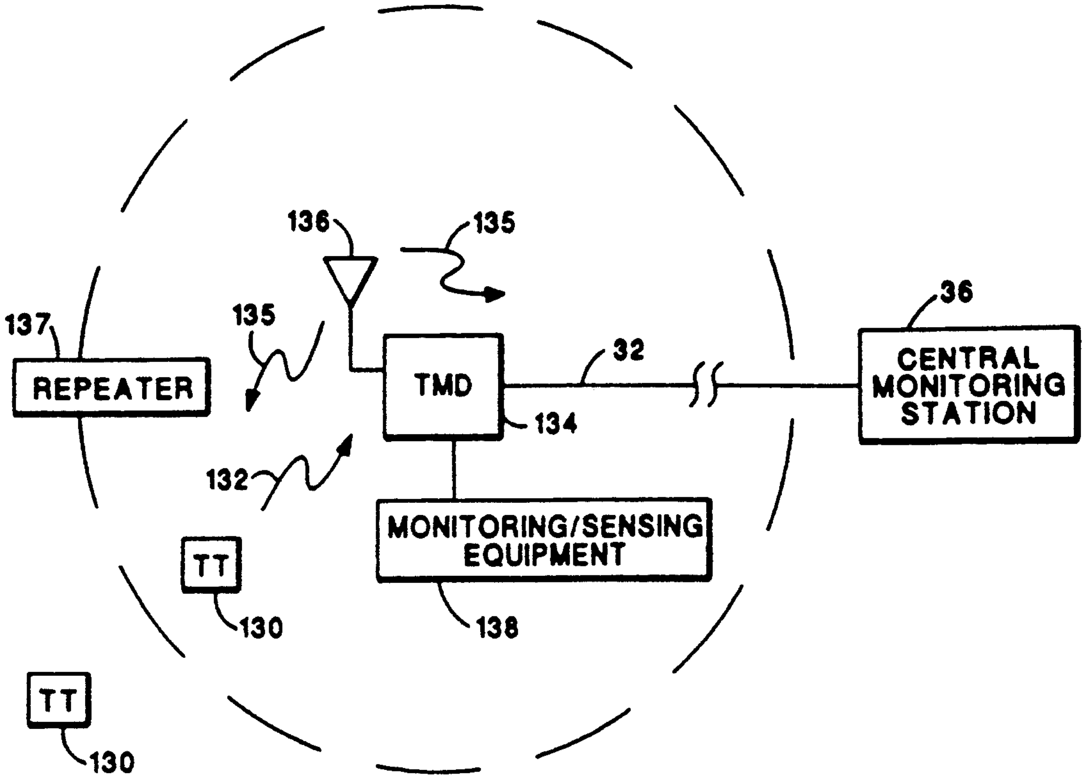
FIG. 6 diagrammatically illustrates the elements of a second embodiment of the invention.

Referring next to FIG. 6, there is shown a diagrammatic illustration of the principal elements of a second embodiment of the present invention. In accordance with this second embodiment, an abuser is fitted with an electronic tag 130, similar to those used in an active Electronic House Arrest Monitoring (EHAM) system. A tag of the type used in an EHAM system is disclosed, e.g, in U.S. Pat. No. 4,885,571, assigned to BI Incorporated, and incorporated herein by reference. The tag 130 worn by the abuser in accordance with this second embodiment is modified somewhat from a typical EHAM tag in that it includes a triggerable transmitter (TT) that transmits an ID signal, represented symbolically in FIG. 6 as the wavy arrow 132, over a limited range only when it receives a trigger signal, or only when it detects a tamper event, i.e., an attempt to remove or interfere with the operation of the tag. Thus, the triggerable transmitter consumes very little power, thereby providing a long battery life, and also providing for a higher transmission power when the ID signal is transmitted.

The victim carries, or always has nearby, a trigger monitoring device (TMD) 134 that includes a receiver for receiving the ID signal 132 transmitted by the abuser's tag, as well as a transmitter for transmitting, through an antenna 136, a trigger signal. The trigger signal is represented by the wavy arrow 135 in FIG. 6, and is transmitted over a second limited range, represented by the dotted circle 140. If the triggerable transmitter 130 comes sufficiently close to the TMD 134 to receive the trigger signal, i.e., if the transmitter 130 comes within range of the TMD 134, then such event triggers the transmission of the ID signal 132 by the abuser's tag 130. This ID signal 132 is then received by the receiving circuits of the TMD 134, thus signalling the approach of the abuser towards the TMD. As with the first embodiment, the TMD 134 includes means for establishing telecommunicative contact with a central monitoring station 36, e.g., through a conventional telephone line or cellular telephone link 32. The TMD includes batteries that may be regularly recharged (thus, power consumption is not a major concern).

In operation, the transmitter portion of the portable TMD periodically, e.g., every 15–30 seconds, sends out a trigger signal 135 with sufficient power to be detected by the triggerable transmitter within a range of approximately ½ mile. At least one repeater circuit 137, adapted to receive and retransmit the trigger signal 135, may be used to achieve this range, or to extend it, as needed or desired. This repeater circuit includes a first transceiver circuit for receiving and retransmitting the trigger signal 135, as well as a second transceiver circuit for receiving and retransmitting the ID signal 132. As with the first embodiment described above in connection with FIG. 1, the repeater circuit(s) 137 is strategically placed to transmit the trigger signal over an area through which the abuser is most likely to come was he or she approaches the victim's residence or place of work. Further, the repeater circuit 137 is positioned to maintain good radio contact with the TMD 134.

In response to being triggered, the triggerable transmitter 130 transmits its unique ID signal 132 with sufficient power to be received by the TMD 134, and/or by the repeater 137. If received by the repeater 137, the ID signal 132 is retransmitted with sufficient power to be received by the TMD 134. Upon receipt of a valid ID signal 134, regardless of whether transmitted directly from the tag 130 or from the repeater 137, the TMD is programmed to take appropriate action, e.g., warn the victim, activate monitoring sensing equipment 138, establish telecommunicative contact with a central monitoring station from which notice can be given to responsible agencies, summon the police, etc.

As with the first embodiment, should the triggerable transmitter 130 (worn by the abuser) detect a tamper event, it generates an appropriate signal that can be detected by the local authorities, e.g. through a cellular telephone network.

A variation of the present invention provides a victim with notice whenever the abuser is in the vicinity of the victim. Such notice is given by way of a small, portable receiver that is adapted to "beep", or provide other detectable notice, whenever the ID signal from the abuser's tag is received. Such reception will occur whenever the abuser comes within range of the receiver. Thus, the victim's receiver is much like a "pager" that is tuned to receive the ID signal from the abuser. While the detected presence of the abuser near the victim may not be evidence of a violation of the protective order (because both the victim and abuser may be in a public location, e.g., a shopping mall, when the abuser is detected by the victim), such notice may still prove helpful to the victim in that he or she can immediately take appropriate steps to avoid or minimize contact with the abuser, or to place himself or herself in an environment (e.g., a crowd) where the abuser is not likely to abuse the victim.

Thus, as seen from the above description, the present invention provides an electronic monitoring system that monitors a first person, e.g., an abuser, for compliance with a protective order that prevents the first person from making any contact with a second person, e.g., a victim. Such system automatically gathers evidence of a violation of the protective order by the first person. Further, such system provides advance notice to the victim in the event the abuser comes near the victim. Such advance notice thereby affords the victim some opportunity to prepare for or avoid contact with the abuser.

As also seen from the above description, it is seen that the invention provides a monitoring system wherein advance notice is also provided to a central monitoring location, whereat such notice alerts law enforcement or other personnel to take appropriate action so as to best enforce the protective order, and (if needed) protect or rescue the victim from abuse.

Advantageously, as also seen from the above description, the monitoring system of the invention further provides a central processing unit (CPU), or equivalent device, at the central monitoring location to process and/or log all the communications that take place between the CPU and a monitoring device placed on or near the victim. A data base is maintained at this CPU so as to automatically provide instructions to operating personnel at the central monitoring location as to how they should proceed to best protect the victim once the abuser is detected as being near the victim.

As further seen from the above description, a no-contact monitoring system is provided wherein the abuser is fitted with an electronic transmitter that periodically, or when triggered, generates a unique identification signal assigned to that particular abuser. Advantageously, such transmitter includes detection means that detects any attempt by the abuser to dissociate himself or herself from the transmitter, and that alerts the monitoring personnel of such attempt.

While the invention herein disclosed has been described by means of specific embodiments and applications thereof, numerous modifications and variations could be made thereto by those skilled in the art without departing from the scope of the invention set forth in the claims.

What is claimed is:

1. An electronic monitoring system for monitoring compliance of a protective order, said protective order being imposed to restrain a first person from coming near a second person, said electronic monitoring system comprising:

a transmitter tag, said transmitter tag including transmitting means for periodically transmitting a first identification signal over a first range, and means for securely attaching said transmitter tag to said first person, whereby the first identification signal generated by the transmitter tag uniquely identifies said first person to whom the transmitter tag is attached;

a monitoring device located proximate said second person, said monitoring device including:

receiving means for receiving said first identification signal when said transmitter tag, and hence when the first person to whom said tag is securely attached, comes within said first range of said monitoring device, verification means for verifying that said first identification signal comprises the identification signal that is transmitted by the transmitter tag attached to said first person, and means responsive to said verification means for promptly establishing a telecommunicative link with a central processing unit (CPU) located at a central monitoring location remote from said monitoring device, and for sending to said CPU a notifying signal through said established telecommunicative link indicating that said first identification signal has been received and verified by said monitoring device, whereby said CPU is put on notice that the transmitter tag, and hence the first person to whom the transmitter tag is attached, has come within the limited range of said monitoring device, and hence that said first person has likely violated said protective order; and evidence gathering means coupled to said monitoring device and responsive to said verification means for automatically gathering evidence from a zone surrounding said monitoring device that helps to establish probable cause that the first person has entered said zone, said evidence gathering means including means for logging the receipt of said first identification signal, and further including a microphone and recording device that are activated in response to a determination by said verification means that said first identification signal has in fact been received by said receiving means;

whereby a violation of said protective order by said first person may be established through evidence gathered by said evidence gathering means.

2. The electronic monitoring system as set forth in claim 1 wherein said notifying signal sent to said CPU includes means for identifying the particular monitoring device at which said first identifying signal was received, and wherein said CPU at said central monitoring location includes notifying means for automatically alerting operating personnel at said central monitoring location of the receipt of said notifying signal, whereby said personnel can take appropriate action to further verify the violation of said protective order.

3. The electronic monitoring system as set forth in claim 2 wherein said CPU includes memory means for storing a response file that contains information about said first person and instructions for the operating personnel at said central monitoring location concerning how to respond to the receipt of a notifying signal from a particular monitoring device, and wherein said CPU includes means for automatically retrieving said response file for use by said operating personnel upon receipt of said notifying signal through said established telecommunicative link.

4. The electronic monitoring system as set forth in claim 3 wherein said response file stored in the memory means of said CPU at the central monitoring location includes information describing the first person, including any history said first person has for abuse or criminal behavior.

5. The electronic monitoring system as set forth in claim 4 wherein said response file stored in the memory means of said CPU includes the identity of at least one law enforcement agency that can be contacted by said operating personnel at said central monitoring location in order to promptly dispatch assistance to said second person to assure compliance with said protective order.

6. The electronic monitoring system as set forth in claim 4 wherein said CPU at said central monitoring location includes means for automatically contacting a designated law enforcement agency in response to receipt of said notifying signal, so that appropriate law enforcement officers can be dispatched to the location of said second person as quickly as possible after receipt of said notifying signal, and further includes means for making the information contained in said response file available to said designated law enforcement agency.

7. The electronic monitoring system as set forth in claim 1 wherein said verification means requires that said first identification signal be received at least a plurality of times within a prescribed time period before a determination is made that said first identification signal has in fact been received.

8. The electronic monitoring system as set forth in claim 1 wherein said telecommunicative link establishing means includes a first modem that couples said monitoring device to a public telephone network, and an automatic dialer that initiates a telephone call to a designated telephone number within said telephone network;

said CPU at said control monitoring location further including a second modem adapted to respond to a telephone call directed to said designated telephone number.

9. The electronic monitoring system as set forth in claim 1 wherein said telecommunicative link establishing means includes a first modem that couples said monitoring device to an emergency communications "911" telephone network, and an automatic dialer that initiates a telephone call to a "911" telephone number within said telephone network;

said CPU at said control monitoring location further being coupled to said emergency communications "911" network, whereby dispatch personnel operating said emergency communications "911" network may benefit from the information contained in the response file maintained by said CPU and any other information maintained in a databank of said "911" network.

10. The electronic monitoring system as set forth in claim 1 wherein said telecommunication link establishing means includes a cellular telephone link.

11. The electronic monitoring system as set forth in claim 1 wherein said telecommunication link establishing means includes a cable television link.

12. The electronic monitoring system as set forth in claim 1 wherein said telecommunication link establishing means includes a satellite communication link.

13. The electronic monitoring system as set forth in claim 1 wherein said transmitter tag includes tamper detection means for sensing a tamper event, a tamper event comprising any attempt to remove said transmitter tag from said first person, and for transmitting a tamper signal indicating that said tamper event has been detected.

14. The electronic monitoring system as set forth in claim 13 wherein said tamper signal is included within said first identification signal, and wherein at least one second monitoring device is located proximate the residence of said first person, said second monitoring device including receiving means for receiving said first identification signal and verifying if said tamper signal is included therein, and if so, establishing a telecommunicative link with said CPU at said central monitoring location and notifying said CPU through said established telecommunicative link that a tamper signal has been received.

15. The electronic monitoring system as set forth in claim 13 further including wide area radio communications (WARC) means for receiving said tamper signal anywhere within a wide geographical area surrounding the location of the monitoring device of said second person, said CPU at said central monitoring location being in constant contact with said WARC so that said CPU is notified of any tamper signal received by said WARC.

16. The electronic monitoring system as set forth in claim 1 further including tamper detection means for sensing a tamper event, a tamper event comprising any attempt to remove said transmitter tag from said first person, said tamper detection means including:

wide area radio communications (WARC) means for receiving said first identification signal anywhere within a wide geographical area surrounding the location of said first and second persons;

said CPU at said central monitoring location being in constant contact with said WARC, and said CPU including means for monitoring the receipt of said first identification signal through said WARC, whereby said CPU monitors through said WARC whether said first identification signal is regularly received, the absence of receipt of said first identification signal providing an indication that a tamper event has occurred.

17. The electronic monitoring system as set forth in claim 16 wherein said tamper detection means further includes means within said transmitter tag for sensing a tamper event, and for generating a tamper signal in response to sensing a tamper event, said tamper signal being included within said first identification signal, said CPU including means for monitoring whether the first identification signal received through said WARC contains said tamper signal.

18. The electronic monitoring system as set forth in claim 1 further including at least one repeater circuit coupled to said monitoring device, said repeater circuit being positioned to receive said first identification signal transmitted from said transmitter tag when the first person comes within the first range of said repeater circuit, said repeater circuit including a receiver circuit for receiving said first identification signal, and transmitter means for retransmitting said first identification signal after a short delay with sufficient power to be received by the receiving means of said monitoring device.

19. An electronic monitoring system for monitoring compliance of a protective order, said protective order being imposed to restrain a first person from coming near a second person, said electronic monitoring system comprising:

a transmitter tag, said transmitter tag including transmitting means for periodically transmitting a first identification signal over a first range, and means for securely attaching said transmitter tag to said first person, whereby the first identification signal generated by the transmitter tag uniquely identifies said first person to whom the transmitter tag is attached;

a monitoring device located proximate said second person, said monitoring device including:

receiving means for receiving said first identification signal when said transmitter tag, and hence when the first person to whom said tag is securely attached, comes within said first range of said monitoring device, verification means for verifying that said first identification signal comprises the identification signal that is transmitter by the transmitter tag attached to said first person, and means responsive to said verification means for promptly establishing a telecommunicative link with a central processing unit (CPU) located at a central monitoring location remote from said monitoring device, and for sending to said CPU a notifying signal through said established telecommunicative link indicating that said first identification signal has been received and verified by said monitoring device, whereby said CPU is put on notice that the transmitter tag, and hence the first person to whom the transmitter tag is attached, has come within the limited range of said monitoring device, and hence that said first person has likely violated said protective order; and evidence gathering means coupled to said monitoring device and responsive to said verification means for automatically gathering evidence from a zone surrounding said monitoring device that helps to establish probable cause that the first person has entered said zone, said evidence gathering means including means for logging the receipt of said first identification signal, and further including a video camera and recording device that is activated in response to a determination by said verification means that said first identification signal has in fact been received by said receiving means;

whereby a violation of said protective order by said first person may be established through evidence gathered by said evidence gathering means.

20. An electronic monitoring system for monitoring compliance with a protective order, said protective order being imposed to restrain a first person from making contact with a second person, said electronic monitoring system comprising:

a transmitter tag carried by said first person, said transmitter tag including first receiving means for receiving a trigger signal, and first transmitting means for transmitting a first identification signal over a limited range in response to receipt of said trigger signal; and a monitoring device located proximate said second person, said monitoring device including second transmitting means for periodically transmitting said trigger signal over a substantial range surrounding said monitoring device, said substantial range being greater than said limited range over which the transmitting means of said transmitter tag transmits said first identification signal, whereby said transmitter tag begins to transmit said first identification signal whenever said transmitter tag, and hence whenever the person carrying said transmitter tag, comes within said substantial range of said monitoring device;

second receiving means for receiving said first identification signal, means responsive to the receipt of said first identification signal at said monitoring device for promptly establishing a telecommunicative link with a central processing unit (CPU) located at a central monitoring location remote from said monitoring device, and for sending to said CPU a notifying signal through said established telecommunicative link indicating that said first identification signal has been received by said monitoring device, whereby said CPU is put on notice that the transmitter tag, and hence the first person who is carrying the transmitter tag, has come within the limited range of the monitoring device, and hence that said first person has likely violated said protective order; and an evidence gathering device coupled to said monitoring device and responsive to the receipt of said first identification signal at said monitoring device that automatically gathers evidence from an area surrounding said monitoring device, said evidence gathering device including:

means for logging the receipt of said first identification signal, whereby a record is maintained of when said first identification signal is received by said monitoring device, and 'a tape recorder for recording at least audio sounds originating near said monitoring device.

21. An electronic monitoring system for monitoring compliance with a protective order, said protective order being imposed to restrain a first person from making contact with a second person, said electronic monitoring system comprising:

a transmitter tag carried by said first person, said transmitter tag including first receiving means for receiving a trigger signal, and first transmitting means for transmitting a first identification signal over a limited range in response to receipt of said trigger signal; and a monitoring device located proximate said second person, said monitoring device including second transmitting means for periodically transmitting said trigger signal over a substantial range surrounding said monitoring device, said substantial range being greater than said limited range over which the transmitting means of said transmitter tag transmits said first identification signal, whereby said transmitter tag begins to transmit said first identification signal whenever said transmitter tag, and hence whenever the person carrying said transmitter tag, comes within said substantial range of said monitoring device;

second receiving means for receiving said first identification signal, means responsive to the receipt of said first identification signal at said monitoring device for promptly establishing a telecommunicative link with a central processing unit (CPU) located at a central monitoring location remote from said monitoring device, and for sending to said CPU a notifying signal through said established telecommunicative link indicating that said first identification signal has been received by said monitoring device, whereby said CPU is put on notice that the transmitter tag, and hence the first person who is carrying the transmitter tag, has come within the limited range of the monitoring device, and hence that said first person has likely violated said protective order; and an evidence gathering device coupled to said monitoring device and responsive to the receipt of said first identification signal at said monitoring device that automatically gathers evidence from an area surrounding said monitoring device, said evidence gathering device including means for logging the receipt of said first identification signal, whereby a record is maintained of when said first identification signal is received by said monitoring device, a microphone for picking up audio sounds originating near said monitoring device, and a recording device that records said audio sounds.

22. The electronic monitoring system as set forth in claim 21 further including a repeater circuit, said repeater circuit including first transceiver means for receiving the trigger signal transmitted by said second transmitting means of said monitoring device, and retransmitting said trigger signal after a prescribed delay, said repeater circuit being positioned sufficiently close to said second transmitting means to receive said trigger signal.

23. The electronic monitoring system as set forth in claim 22 wherein said repeater circuit further includes second transceiver means for receiving the first identification signal transmitted by said first transmitting means of said transmitter tag, and retransmitting said first identification signal after a prescribed delay.

24. An electronic monitoring system for monitoring compliance with a protective order, said protective order being imposed to restrain a first person from making contact with a second person, said electronic monitoring system comprising:

a transmitter tag carried by said first person, said transmitter tag including first receiving means for receiving a trigger signal, and first transmitting means for transmitting a first identification signal over a limited range in response to receipt of said trigger signal; and a monitoring device located proximate said second person, said monitoring device including second transmitting means for periodically transmitting said trigger signal over a substantial range surrounding said monitoring device, said substantial range being greater than said limited range over which the transmitting means of said transmitter tag transmits said first identification signal, whereby said transmitter tag begins to transmit said first identification signal whenever said transmitter tag, and hence whenever the person carrying said transmitter tag, comes within said substantial range of said monitoring device;

second receiving means for receiving said first identification signal, means responsive to the receipt of said first identification signal at said monitoring device for promptly establishing a telecommunicative link with a central processing unit (CPU) located at a central monitoring location remote from said monitoring device, and for sending to said CPU a notifying signal through said established telecommunicative link indicating that said first identification signal has been received by said monitoring device, whereby said CPU is put on notice that the transmitter tag, and hence the first person who is carrying the transmitter tag, has come within the limited range of the monitoring device, and hence that said first person has likely violated said protective order; and an evidence gathering device coupled to said monitoring device and responsive to the receipt of said first identification signal at said monitoring device that automatically gathers evidence from an area surrounding said monitoring device, said evidence gathering device including means for logging the receipt of said first identification signal, whereby a record is maintained of when said first identification signal is received by said monitoring device, a video camera for picking up video signals originating near said monitoring device, and a recording device that records said video signals.

* * * * *